Sept. 29, 1942.  P. E. HAWKINSON  2,297,354
METHOD OF TREADING TIRE CASINGS
Filed Jan. 30, 1941  4 Sheets-Sheet 1

Inventor
Paul E. Hawkinson
By his Attorneys
Merchant & Merchant

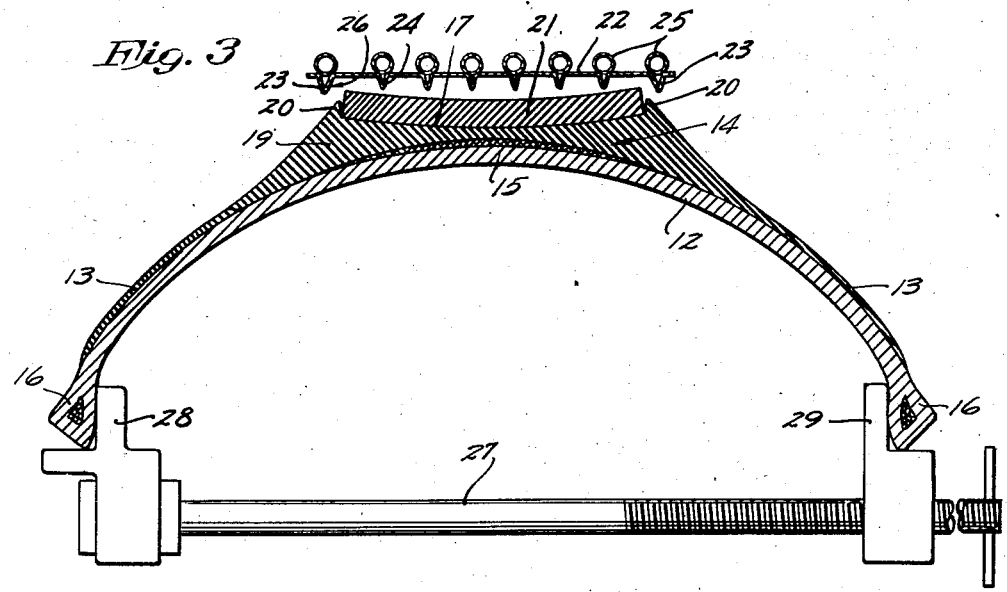
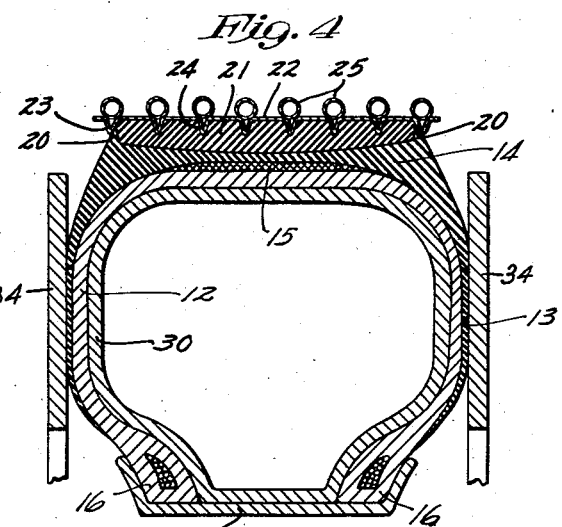
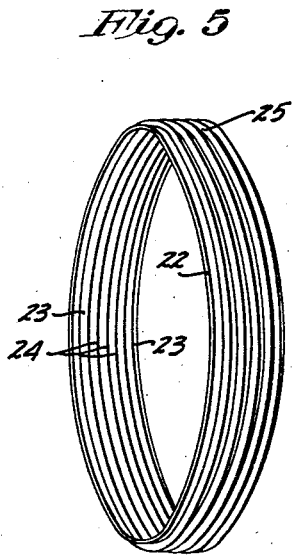

Inventor
Paul E. Hawkinson
By his Attorneys
Merchant & Merchant

Sept. 29, 1942.    P. E. HAWKINSON    2,297,354
METHOD OF TREADING TIRE CASINGS
Filed Jan. 30, 1941    4 Sheets-Sheet 4
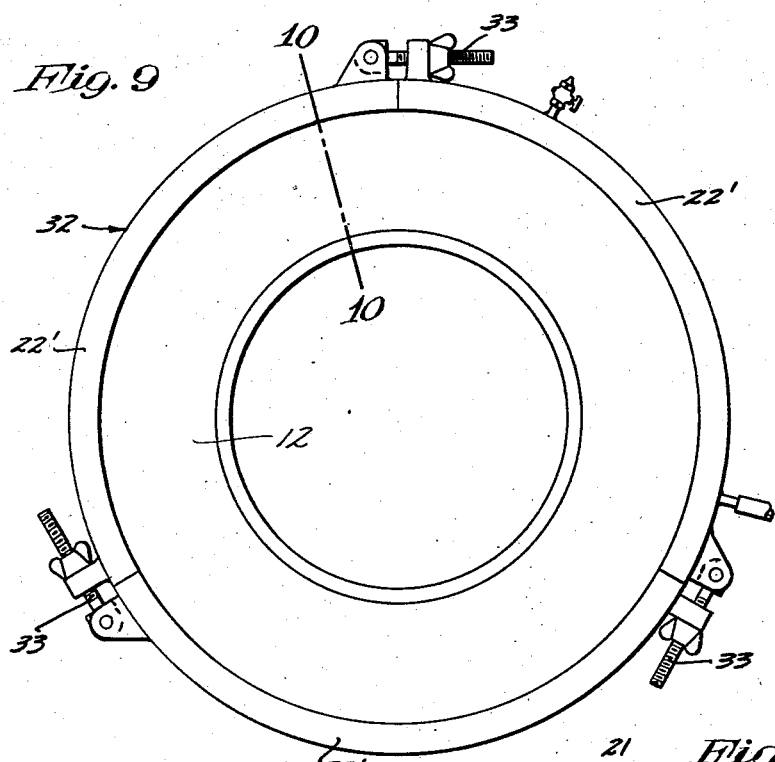
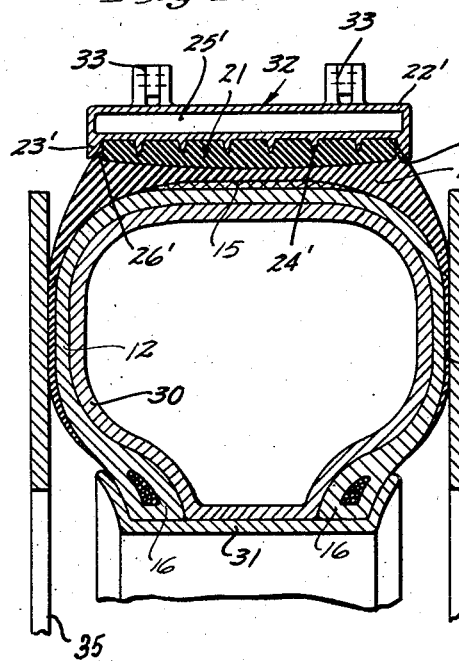
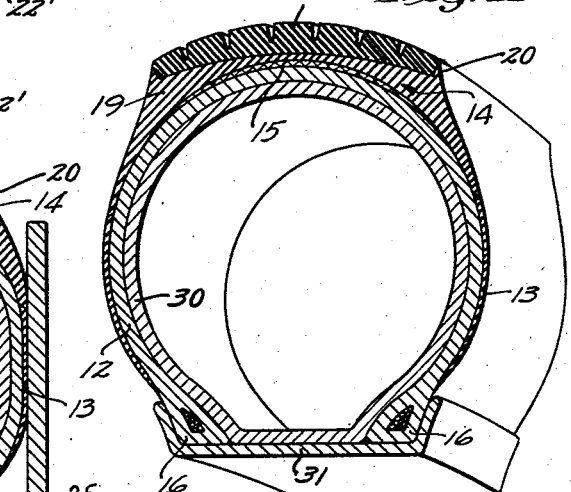
Inventor
Paul E. Hawkinson
By his Attorneys
Merchant & Merchant Patented Sept. 29, 1942

2,297,354

UNITED STATES PATENT OFFICE 2,297,354

METHOD OF TREADING TIRE CASINGS

Paul E. Hawkinson, Minneapolis, Minn.

Application January 30, 1941, Serial No. 376,607

7 Claims. (Cl. 18—59)

This invention relates to an improved method of adding annular bands of new road-engaging tread material to the incomplete treads of previously cured tire casings for the purpose of replacing such tread as may have been worn off in use or otherwise removed, or for the purpose of completing the treads of tire casings that have been built up and cured with a partial or incomplete tread.

In a more specific sense the invention may be said to relate to improvements in that kind of tire treading now often referred to as "top capping" and wherein an annular band of tread material is applied to and cured on the peripheral crown surface of a previously cured but incomplete base tread material of a tire casing without removing any material portion of the marginal edges of the thick shoulders of the original base tread material. This particular kind of tire treading known as "top capping", as now widely practiced, can be divided into two general types which are as follows, to wit:

(a) That type of "top capping" which is carried out in accordance with the teachings of my prior Patents Nos. 1,917,261 and 1,917,262 and wherein the added band of tread material is cured on the peripheral crown surface of a tire in an annular mold that engages only the newly added tread material and the laterally spaced edge portions of the transversely relatively flat peripheral crown surface of the original base tread material (the road-engaging crown surface in the case of a worn tire casing) in laterally spaced relation to the marginal edges of the said crown surface and the thick shoulders of the original base tread; and (b) That type of "top capping" wherein the newly applied tread material is cured on the peripheral crown surface of the original tread material in an annular mold that engages the newly applied tread material and radially overlaps the marginal edges of the thick shoulders of the original tread material and makes sealing contact with the laterally spaced side portions of such thick shoulders laterally outwardly and radially inwardly of the marginal edges thereof and the marginal edges of the peripheral crown surface of the original tread.

In "top capping" of type a the laterally spaced annular confining surfaces or flanges of the mold make sealing contact with the original base tread material only at the laterally spaced edge portions of the relatively flat crown thereof and do not extend laterally or radially beyond the marginal edges of the thick shoulders or crown surface of the original tread material, so that the original tread material is in no way restricted against lateral expansion or contraction by the mold, and tires of quite widely varying width between the laterally spaced edges of their crown surfaces may be top capped in the same mold without risk of losing sealing contact between the mold and original tread and without danger of laterally buckling the tire casing during the final curing operation, all pressure between the mold and tire in this type of capping being in a direction radially of the axis of the casing.

In top capping of type b sealing pressure between the mold and original tread material is exerted in a direction laterally or laterally and radially of the tire axis so that the problem of obtaining a proper transverse fit between the original tread material and the mold becomes very critical, since, if the original tire tread be only slightly too narrow, lateral sealing pressure will be lost, and if the original tread material be too wide, the original tread material will be subject to excessive lateral pressure during the final curing operation, which latter tends to and often does result in transverse buckling of the carcass.

In summary it may be said that top capping of type a above has the advantage of being somewhat easier to practice and results in the production of a more uniformly dependable product than type b, but is subject to some criticism particularly with respect to the appearance of the finished product, such criticism being based on the fact that the laterally spaced marginal edges of the finally added crown tread material are somewhat out of registration with the marginal edges of the original tread material, and that "top capping" of type b, while providing a more finished and better appearing product on the average than type a, requires more skill in practicing and is very apt to result in the subjection of the tire carcass to damaging lateral pressure during the final curing operation, even in the hands of a skilled operator.

The present invention has for its object the provision of a new method of top capping which, while largely retaining the desirable characteristics of type a above, particularly with respect to the ability of type a to tread tires of different transverse widths in a single width mold under proper curing pressure and without danger of exerting lateral buckling pressure on the previously cured tire casing, will produce a finished product that is not only equal to but, in fact, superior in appearance to the finished product of tires top capped in accordance with type b'.

Another problem inherent in top capping of type a, and one which is not present in top capping of type b, is the matter of properly laterally centering the mold on the crown of the original tread material and in which respect it may be said that the matter of initially centering the mold is difficult even for an experienced operator and that maintaining such centering during the curing operation particularly while the new tread material is in a flowing condition, presents a further problem usually requiring special devices for holding the mold against lateral shifting movements in respect to the tire casing. Of course, this problem of centering and maintaining a centered relation of the mold in respect to the tire is not present in top capping of type b, since the mold of this type engages the original tire material in a direction lateral of the tire axis and automatically centers and maintains the proper centered relation. Hence, the present invention has as another important objective the provision of a method whereby the mold will be automatically centered with respect to the tire and will be retained thus centered during the curing operation without incurring the risk of poor sealing contact between the mold and original tire material and without incurring the risk of subjecting the tire to undue transverse buckling pressure during the curing operation.

The above and other highly important objects and advantages of the invention will be made apparent from the following specification and claims and the appended drawings.

In the accompanying drawings like characters indicate like parts throught the several views.

Referring to the drawings:

Fig. 3 is a sectional view illustrating the manner in which the casing, treaded as in Fig. 2, may be placed within a complete annular mold or curing band of less diameter and circumference than the normal diameter and circumference of the treaded casing and this without opening the mold;

Fig. 4 is a cross-sectional view illustrating the treaded casing as it will appear during the curing operation after having been placed in the mold, as in Fig. 3;

Fig. 5 is a perspective view on a very much reduced scale of a complete annular mold or curing band of the kind shown in Figs. 3 and 4;

Figure 6:
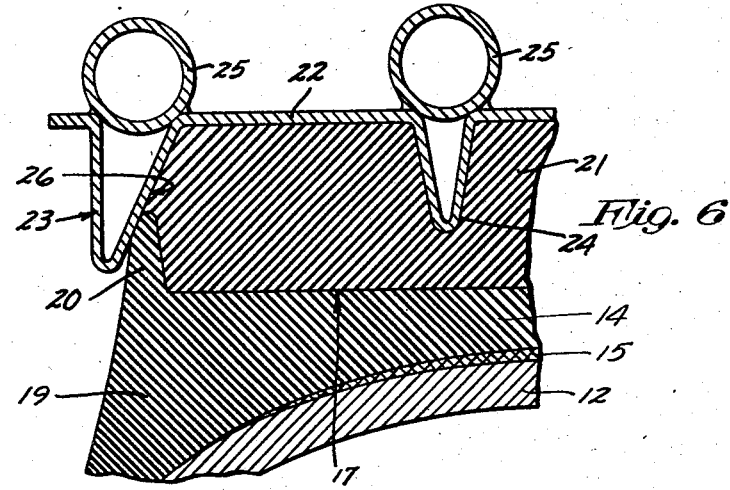
Figure 7:
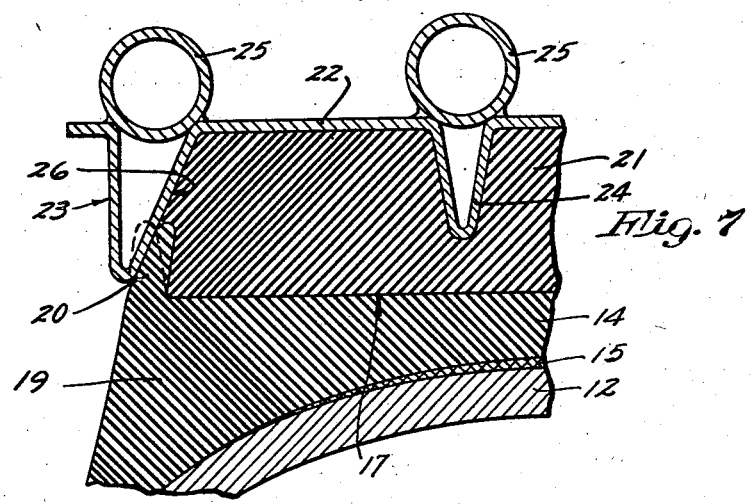
Figure 8:
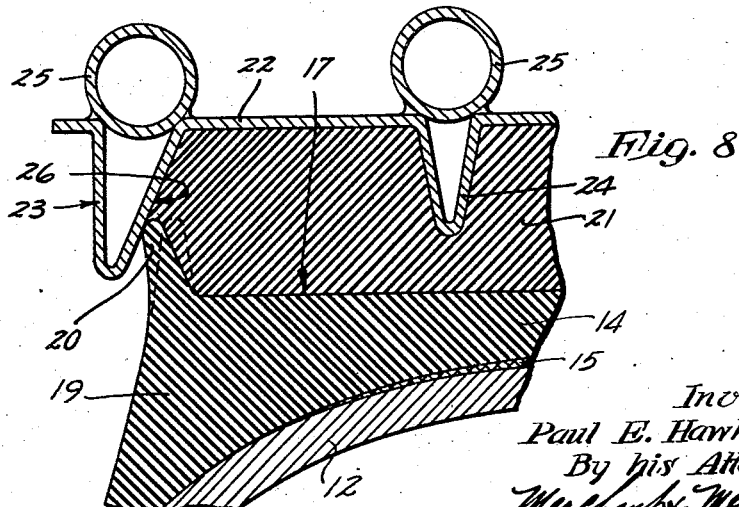

Fig. 6 is a fragmentary transverse sectional view showing the mold positioned on the tire for the curing operation as in Fig. 4, but on a greatly enlarged scale, and is intended to illustrate particularly the relation between the ribs of the previously cured base tread material and the mold when the transverse width of the mold happens to be approximately midway between the maximum and minimum extremes permissible;

Fig. 7 is a view substantially like Fig. 6 but illustrating the relation between the mold and pre-cured tread ribs when a tire having a somewhat wider original base tread is employed;

Fig. 8 is another view closely corresponding to Figs. 6 and 7 but illustrating the still different relation between the mold and pre-cured tread ribs of the base tread material that occurs when a tire casing is employed having an original base tread material of under-size transverse dimensions with respect to the mold;

Fig. 9 is a view in side elevation of a multiple section type of mold, as distinguished from the single section type of mold illustrated in Fig. 5, and containing a tire as during the curing operation, but with the side pressure plates removed;

Fig. 10 is a view corresponding to Fig. 4 but taken on the line 10—10 of Fig. 9 and having some parts not shown in Fig. 9, namely the side pressure plates, added thereto; and Fig. 11 is a sectional fragmentary perspective view showing the tire of Fig. 10 as it appears subsequent to the final curing operation and after it is inflated, as for service.

The tire casing of all figures hereof includes the usual carcass 12 that may be assumed to be made up of superimposed layers of diagonally disposed cords adhered together by a resilient binder of rubber or like material, and further includes side wall protecting layers of rubber or similar substance 13 over the lower side walls of the carcass, and a partial or incomplete base tread material 14 applied over the crown portion of the carcass with the customary breaker strip 15 interposed therebetween and the crown of the carcass. The carcass described has the customary reinforced rim-engaging beads 16. It may be assumed that all of the elements 12 to 16 inclusive were made up in a raw state and then cured in the customary fashion in a single curing operation.

Figure 1:
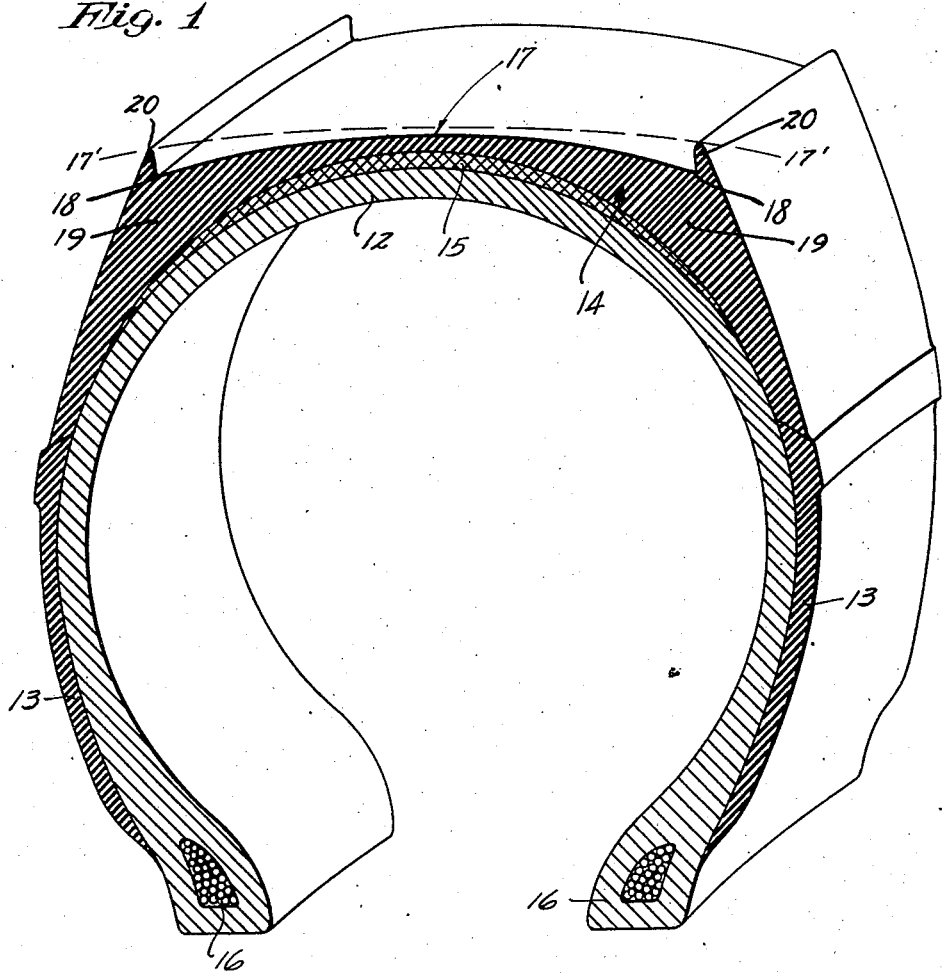
Fig. 1 is a fragmentary sectional perspective view of a tire casing having its base tread material formed to provide circumferentially extending and radially projecting ribs, at the marginal edges of its crown surface, for the purpose of carrying out the present invention.
Figure 2:
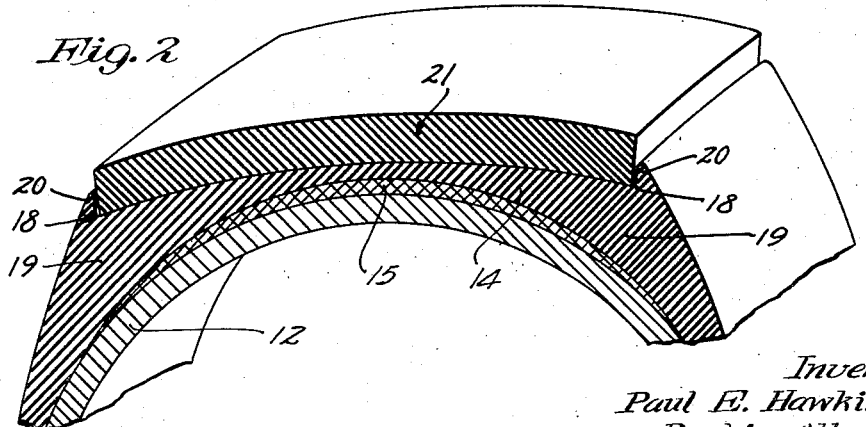
Fig. 2 is a view corresponding to Fig. 1 but illustrating the tire of Fig. 1 as it appears with the annular band of new tread material applied to the crown surface thereof intermediate the marginal ribs thereof and prior to the curing operation.

In Figs. 1, 2 and 11 the carcass of the casing is shown in a normal cross-sectionally cylindrical shape which is the shape which the carcass tends to assume when inflated and unrestrained against outward expansion and in which shape the carcass hereof may be assumed to have been cured. The crown surface of the base tread material 14, and which crown surface is indicated by 17 and extends between points 18—18, also has a circular or arcuate contour but the radius of the arcuate surface 17 is much greater than that of the underlying carcass and, hence, the crown surface 17 is relatively flat as compared to the arcuate contour of the carcass, and by reason of this fact the crown tread material 14 is progressively thicker from its transverse center towards its opposite laterally spaced edges and forms thick shoulder tread portions 19 radially inwardly of the laterally spaced marginal edge portions of the crown surface 17. In Figs. 1 to 4 inclusive, 6 to 8 inclusive and 10 and 11, these thick shoulder portions 19 of the original base tread material 14 are shown as being formed to provide, at their marginal edges and at the marginal edges 18—18 of the crown surface 17, radially projecting circumferentially extending ribs or flanges 20, which flanges are preferably and may be assumed to be complete and unbroken circumferentially of the tire. The original base tread material 14, in which the ribs or flanges 20 are formed, may be assumed to be of elastic tread stock such as is common in present day tires and which is usually a rubber composition, so that the ribs or flanges 20 thereof will be elastic and will yield readily to pressure exerted thereon laterally of the axis of the tire.

For the purpose of new tire manufacture the original base tread material 14 will be formed, during the initial curing operation, to provide the laterally yieldable ribs or flanges 20, but in practicing the invention in connection with worn tire casings the original previously cured base tread material 14 will be cut or buffed down intermediate its laterally spaced marginal edges to provide the ribs or flanges 20. In this latter respect attention is directed to the fact that tire casings worn down to the point where top capping is desirable, will have a relatively flat crown surface, the contour of which is substantially represented by the broken line 17'—17' in Fig. 1. To form the ribs or flanges 20 in such a tire the crown portion of the original base tread material is merely cut or buffed down intermediate its extreme marginal edges to leave at the marginal edges the radially projecting and circumferentially extending annular flanges 20.

The next step in the method consists in applying to the crown surface 17 of the base tread material, intermediate the marginal ribs or flanges 20 thereof, an annular band of road-engaging tread material 21, which is uncured or at least requires additional curing and is elastic and will have a high degree of elasticity when cured. This annular band of road-engaging tread material 21 will usually be cemented to the crown surface 17.

The next step in the method hereof consists in curing and forming the newly applied band of tread material 21, and for this purpose I employ an annular mold or curing ring that engages the newly applied tread material 21 and makes sealing contact with the laterally yieldable flanges or ribs 20 of the previously cured tread 14. One type of mold which can be used to fulfill this requirement and the one which I most preferably employ in carrying out the method, is shown in Figs. 3 to 8 inclusive, and another type of mold which satisfactorily serves this purpose is shown in Figs. 9 and 10. The mold of Figs. 3 to 8 inclusive is of the general character fully disclosed in my prior Patent No. 1,917,262 and is in the nature of a complete one-section annular band of sheet metal 22 that is formed at its marginal edges with radially inwardly projecting, circumferentially continuous tread material confining flanges 23. The mold or curing ring 22 is formed intermediate the confining flanges 23 with radially inwardly projecting tread design-forming flanges or surfaces 24, and the said mold is adapted to be heated in any suitable manner but preferably by passing steam or other hot fluid through a radiating coil or coils 25 wound about the exterior thereof and secured thereto preferably by solder or the like. Preferably, and as herein illustrated, the mold confining flanges 23 have radially outwardly converging sealing surfaces 26 that are adapted to engage and make sealing contact with the outside surfaces of the ribs or flanges 20 of the base tread material 14. Mold or curing rings of this type, and which are known to the trade as "Hawkinson molds," are preferably flat in transverse section so that the road-engaging crown surface of the newly applied tread material will be cured transversely flat throughout its circumference to conform to the flat transverse contour thereof when contacting the road under load, and the maximum internal diameters of such molds are preferably considerably less than the normal inflated diameter of the road-engaging crown surface of the ultimately finished tire so that the annular band of tread material 21 will be cured while it and the crown portion of the carcass and original tread material are in a circumferentially and radially contracted condition. In fact, the radius of the maximum internal diameter of the mold 22 is preferably calculated to approximate the "loaded rolling radius of the tire," which is the radial measurement of the tire from its axis to the longitudinal center of the flat line of contact between the tread material 14 and the road, under normal load. The advantages of thus curing the road-engaging tread 14 to the approximate rolling radius and in a transversely flat contour is now well recognized in the industry. When using molds of this "Hawkinson" type for the purpose of carrying out the present invention, they are preferably selected so that the maximum spacing between the laterally spaced confining surfaces 26 thereof is slightly greater than the minimum space between the lateral outside surfaces of the laterally spaced tread ribs 20 so that the confining surfaces 26 will receive between them and make sealing contact with the ribs or flanges 20 without requiring or causing material lateral yielding movements of said ribs or flanges 20, such an ideal condition being shown in Fig. 6.

The tire, treaded as in Fig. 2, may be assumed to have been placed in the mold 22 in the manner taught in my prior Patents Nos. 1,917,261 and 1,917,262 and partially illustrated in Fig. 3, and which consists in circumferentially and radially contracting the treaded crown portion of the casing by laterally spreading the beads 16 thereof at all points about their circumference. In commercial practice this spreading of the beads to contract the casing circumferentially and radially is usually accomplished by placing the casing on a conventional tire spreader, but this spreading of the beads can also be accomplished by means of a plurality of hand spreaders, such as shown in Fig. 3, applied in circumferentially spaced relation about the beads. The spreader of Fig. 3 comprises a screw-threaded stem 27 having a journaled but axially fixed bead-engaging lug 28 at one end and a bead-engaging lug 29 screw-threaded on its intermediate portion. After the casing has been contracted radially and circumferentially to the extent necessary to permit lateral insertion thereof into the mold, it is relieved of lateral spreading action and permitted to expand by its own energy against the interior of the mold, after which the casing is equipped with the customary inner tube or air bag 30 and wheel rim 31 and inflated to a satisfactory curing pressure. This internal expanding pressure will cause the tread material 14 to form about the tread design-forming surfaces of the mold and to largely seat itself within the mold and will usually be sufficient to bring the confining surfaces 26 of the mold into sealing contact with the tread ribs or flanges 20. To cure the new tread the mold is now heated to the desired temperature and for the proper time to fully cure the new tread material, and which time element need not be of sufficient duration to cause any over-curing or, in fact, any further curing of the previously cured tread or carcass.

If the relative transverse dimensions of the mold and the ribs 20 of the previously cured tread material are ideal, sealing contact between the confining surfaces 26 of the mold and the laterally yieldable ribs 20 will be made, as previously indicated, without requiring or causing any material laterally flexing of the tread ribs 20, and the relation of the elements will then be substantially as indicated in Fig. 6. However, if the tire be of somewhat greater width or be somewhat transversely over-size with respect to the mold, the lateral yieldable tread ribs or flanges 20 will, upon being engaged by the confining surfaces 26 of the mold flanges 23, be flexed or bent laterally inwardly substantially as shown in Fig. 7, wherein dotted lines indicate the normal positions of the tread flanges 20 and full lines indicate the inwardly bent positions thereof, and this without subjecting the previously cured tread material or carcass to any material degree of lateral pressure. On the other hand if the particular tire being treaded is somewhat under-size in transverse dimensions with respect to the particular mold being used, the tendency of the tread material 14 to flow under pressure or under heat and pressure will force the laterally yieldable tread ribs 20 to bend outwardly until they come into and make sealing contact with the confining surfaces 26 of the mold substantially as shown in Fig. 8 wherein dotted lines represent the normal position of the tread flanges 20 and full lines indicate the outwardly bent or flexed condition thereof.

By reference to Figs. 6 to 8 inclusive particularly it will be evident that by this method tires with a considerable variation in transverse width, as measured between the marginal edges of their shoulders, may be successfully treaded or "top capped" in a mold of given width and this without loss of sealing pressure between the mold sealing surfaces and the base tread flanges 20, and also without laterally buckling the carcass. When the curing operation is complete, the new tread material 21 will become very tightly bonded to the crown surface 17 of the base tread material 14 and to the contracted portions of the laterally yieldable tread flanges 20, and the sides of the new tread material 21 will form uninterrupted continuous side portions of the tread flanges 20. Hence, as will be seen by further reference to Figs. 6 to 8 inclusive, the finished product will appear substantially as though the complete tread had been cured in a single operation. With respect to the obtaining of a theoretically perfect transverse matching of the width of a mold to the width of the crown of the tire, attention is directed to the fact that this is very difficult, first, because new tires of different makes vary considerably in such dimensions; second, because all tires grow to a greater or less extent in service; third, because the widths of the crown treads of tires vary according to the extent of wear; and, fourth, because a tire casing, including its crown tread material, becomes transversely wider as the radius and circumference thereof is decreased, thereby necessitating, on the part of an operator if he is to obtain exactly the desired fit, that he calculate the amount of the lateral expansion of the crown tread material that will take place under such radial and circumferential contraction thereof as is necessary to fit the casing into a certain mold having an internal diameter less than that of the finished casing.

The mold of Figs. 9 and 10 differs from the mold of the previous figures mainly in the facts that it is a cast structure as distinguished from a sheet metal structure and also that it is a multiple section structure as distinguished from a single section structure of the previous figures. This latter mold, which is indicated as an entirety by 32, is made up of a plurality of circumferentially extended sections 22' that are adapted to be clamped together about the tire, treaded as in Fig. 2, by means of suitable clamping devices 33, and by which sections are provided with steam cavities 25' for the purpose of heating the mold. Although this latter mold is a cast structure, the interior thereof is shown as formed to a contour substantially identical to the interior contour of the mold of the before described figures, the retaining flanges of this mold being indicated by 23', the confining surfaces thereof by 26' and the tread design-forming surfaces by 24'. In using this mold the sections 22' will be separated sufficiently to permit lateral entrance of the treaded casing, after which the sections will be drawn together about the treaded tire, which act will serve to reduce the radius of the casing by radial compression of the mold thereon. However, once the sections have been drawn together the mold of Figs. 9 and 10 will function substantially identical to the mold before described. In fact, when the finally cured tire is removed from either form of mold and inflated, as in Fig. 11, it will appear substantially identical and, hence, Fig. 11 may be assumed to represent an inflated tire that was treaded in either form of mold.

During the tread curing operation the side walls of the tire casing are preferably, although not essentially, relieved of strain caused by internal expanding pressure by annular side pressure plates, indicated by 34 in Fig. 4 and by 35 in Fig. 10. These side pressure plates 34 and 35 are of the character commonly used in carrying out the well known Hawkinson method of treading tire casings and, in practice, are held against axial separation by suitable clamping devices such, for example, as are illustrated in my prior Patent No. 1,917,261.

What I claim is:

1. The method of adding an annular band of additional road-engaging tread material to a pre-cured tire casing which has a cured but incomplete crown tread formed at the opposite marginal edges of its crown surface with circumferentially continuous ribs that project radially beyond the adjacent edge portions of the crown surface of the pre-cured tread, which consists in applying to the crown surface of the pre-cured tread, intermediate the annular ribs thereof, an annular band of tread material, and in finally curing the newly applied tread material to the crown surface of the pre-cured tread material in a mold that engages only the newly applied tread material and the laterally outer sides of the marginal ribs of the pre-cured tread material.

2. The method of adding an annular band of additional road-engaging tread material to a pre-cured tire casing which has a cured but incomplete crown tread formed at the opposite marginal edges of its crown surface with circumferentially continuous ribs that project radially beyond the adjacent edge portions of the crown surface of the pre-cured tread, which consists in applying to the crown surface of the pre-cured tread, intermediate the annular ribs thereof, an annular band of tread material, and in finally curing the newly applied tread material under heat and pressure while confining the same within an annular mold that engages only the newly applied tread material and the laterally outer sides of the said material ribs of the pre-cured tread material.

3. The method of adding an annular band of road-engaging tread material to a pre-cured tire casing that has a cured but incomplete crown tread formed at the opposite marginal edges of its crown surface with circumferentially extended ribs projecting radially outwardly of the adjacent portions of the crown surface of the pre-cured tread material, which consists in applying to the crown surface of the pre-cured but incomplete tread material, intermediate said ribs, an annular band of tread material requiring curing, and in finally curing the newly applied tread material under heat and pressure while confining the same within an annular mold that engages only the newly applied tread material and the laterally outer sides of the ribs of the pre-cured tread material.

4. The method of adding an annular band of road-engaging tread material to a pre-cured tire casing that has a cured but incomplete crown tread formed at the opposite marginal edges of its crown surface with circumferentially extended ribs projecting radially outwardly of the adjacent portions of the crown surface of the pre-cured tread material, which consists in applying to the crown surface of the pre-cured but incomplete tread material, intermediate said ribs, an annular band of tread material requiring curing, and in finally curing the newly applied tread material under heat and pressure while confining the same within an annular mold that engages only the newly applied tread material and the laterally outer sides of the ribs of the pre-cured tread material, and engages the said ribs of the pre-cured tread material with radially outwardly converging annular confining surfaces.

5. The method of adding an annular band of road-engaging tread material to a pre-cured tire casing having a cured but incomplete crown tread formed at the opposite marginal edges of its crown surface with radially projecting annular ribs that are yieldable laterally of the tire axis, which consists in applying to the crown surface of the pre-cured but incomplete tread material, intermediate said laterally yieldable ribs, an annular band of tread material requiring curing and which is fluent during the curing operation, and in finally curing the newly applied tread material under heat and pressure in an annular mold that engages only the newly applied tread material and the laterally outer sides of the pre-cured tread material.

6. The method of adding an annular band of road-engaging tread material to a pre-cured tire casing having a cured but incomplete crown tread formed at the opposite marginal edges of its crown surface with radially projecting annular ribs that are yieldable laterally of the tire axis, which consists in applying to the crown surface of the pre-cured but incomplete tread material, intermediate said laterally yieldable ribs, an annular band of tread material requiring curing and which is fluent during the curing operation, and in finally curing the newly applied tread material under heat and pressure in an annular mold that engages the periphery of the newly applied tread material and makes sealing contact with the laterally outer sides of said laterally yieldable pre-cured tread ribs and while leaving those portions of the casing radially inwardly of the annular pre-cured tread ribs unconfined against lateral movement.

7. The method of adding an annular band of road-engaging tread material to a pre-cured tire casing which has a cured but incomplete crown tread formed at its opposite marginal edge portions with radially projecting circumferentially continuous ribs, which consists in applying to the periphery of the pre-cured crown tread, intermediate said radially projecting ribs, an annular band of tread material requiring curing, and in finally curing the newly applied tread material under heat and pressure in a mold between which and the new tread material there is a pressure exerted radially of the tire axis and between which and the original tire material, lateral sealing pressure is exerted only on the newly applied tread material and at the laterally spaced outer side portions of the pre-cured tread ribs.

PAUL E. HAWKINSON.